United States Patent
Marozin

(10) Patent No.: US 10,311,175 B2
(45) Date of Patent: Jun. 4, 2019

(54) COMPUTER-IMPLEMENTED METHOD FOR DEFINING THE POINTS OF DEVELOPMENT OF SUPPORTING ELEMENTS OF AN OBJECT MADE BY MEANS OF A STEREOLITHOGRAPHY PROCESS

(71) Applicant: DWS S.R.L., Thiene (IT)

(72) Inventor: Alessandro Marozin, Zane (IT)

(73) Assignee: DWS S.R.L., Thiene (IT)

( * ) Notice: Subject to any disclaimer, the term of this patent is extended or adjusted under 35 U.S.C. 154(b) by 0 days.

(21) Appl. No.: 15/128,658

(22) PCT Filed: Mar. 20, 2015

(86) PCT No.: PCT/IB2015/052057
§ 371 (c)(1),
(2) Date: Sep. 23, 2016

(87) PCT Pub. No.: WO2015/145318
PCT Pub. Date: Oct. 1, 2015

(65) Prior Publication Data
US 2018/0181688 A1 Jun. 28, 2018

(30) Foreign Application Priority Data
Mar. 25, 2014 (IT) .............................. VI2014A0069

(51) Int. Cl.
*G06F 17/50* (2006.01)
*B33Y 50/00* (2015.01)
(Continued)

(52) U.S. Cl.
CPC ........ *G06F 17/5009* (2013.01); *B29C 64/124* (2017.08); *B29C 64/386* (2017.08);
(Continued)

(58) Field of Classification Search
CPC ........... B33Y 40/00; G06T 17/00; G06T 1/00; G05B 19/4099; B22C 9/04; B23P 15/00; B29C 64/40; G03F 7/705
See application file for complete search history.

(56) References Cited

U.S. PATENT DOCUMENTS 5,184,307 A * 2/1993 Hull ...................... G01J 1/4257
156/273.3
5,999,184 A * 12/1999 Smalley ................. G06T 17/00
345/419
(Continued)

FOREIGN PATENT DOCUMENTS

| EP | 0322257 A2 | 6/1989 |
| EP | 2203297 | 7/2010 |

OTHER PUBLICATIONS

International Search Report regarding PCT/IB2015/052057, dated Jul. 22, 2015 (5 pgs.).
(Continued)

*Primary Examiner* — Kandasamy Thangavelu
(74) *Attorney, Agent, or Firm* — Husch Blackwell LLP

(57) ABSTRACT

Computer-implemented method for defining, on a three-dimensional model of an object (1), the points of development (6) of supporting elements (7) of the object (1) during its production through a stereolithography process. The method includes the steps of defining the surfaces or portions of surfaces (2) of the object (1) whose points are oriented towards a reference plane ($\pi$); of tracing a predefined grid of points (3) on each one of the surfaces or portions of surfaces (2); of identifying, for each one of the surfaces or portions of surfaces (2), the presence of at least one local minimum point (5) with respect to the reference plane ($\pi$); of adapting, for each one of said surfaces or portions of surfaces (2), the grid of points (3) so that one of the points of the grid (3) substantially coincides with the
(Continued)

local minimum point (5); and of identifying the points of the adapted grid (3) as points of development (6) of the supporting elements (7) for each one of said surfaces or portions of surfaces (2).

19 Claims, 6 Drawing Sheets

(51) Int. Cl.
B29C 64/124 (2017.01)
B29C 64/386 (2017.01)
B29C 64/40 (2017.01)

(52) U.S. Cl.
CPC .............. *B29C 64/40* (2017.08); *B33Y 50/00* (2014.12); *G06F 17/50* (2013.01)

(56) References Cited

U.S. PATENT DOCUMENTS

| | | | | |
|---|---|---|---|---|
| 6,215,095 | B1* | 4/2001 | Partanen | B29C 64/40 156/272.8 |
| 6,450,393 | B1* | 9/2002 | Doumanidis | B23P 15/00 156/264 |
| 2004/0006405 | A1* | 1/2004 | Chen | G05B 19/4099 700/119 |
| 2004/0189145 | A1* | 9/2004 | Pletner | G03F 7/70725 310/311 |
| 2009/0072447 | A1* | 3/2009 | Hull | B33Y 40/00 264/401 |
| 2009/0076999 | A1* | 3/2009 | De Mol | G03F 7/705 706/52 |
| 2010/0125356 | A1* | 5/2010 | Shkolnik | G06T 1/00 700/98 |
| 2011/0189440 | A1* | 8/2011 | Appleby | B22C 9/04 428/156 |

OTHER PUBLICATIONS

Written Opinon of the International Searching Authority regarding PCT/IB2015/052057, dated Jul. 22, 2015 (9 pgs.).
Allen et al., "Determination and Evaluation of Support Structures in Layered Manufacturing", J. of Design and Manufacturing, Chapman & Hall, London, vol. 5, No. 3 pp. 153-162.
Marsan et al.. "An Integrated Software System for Process Planning for Layered Manufacturing", Proc. from the 1997 Solid Freeform Fabric. Symp., Austin TX, 1997 pp. 661-668.
Bo et al., "Support Fast Generation Algorithm Based on Discrete-Marking in Stereolithography Rapid Prototyping", Rapid Proto. J., MCB Univ. Press, Bradford vol. 17, No. 6 Jan., pp. 451-457.

* cited by examiner

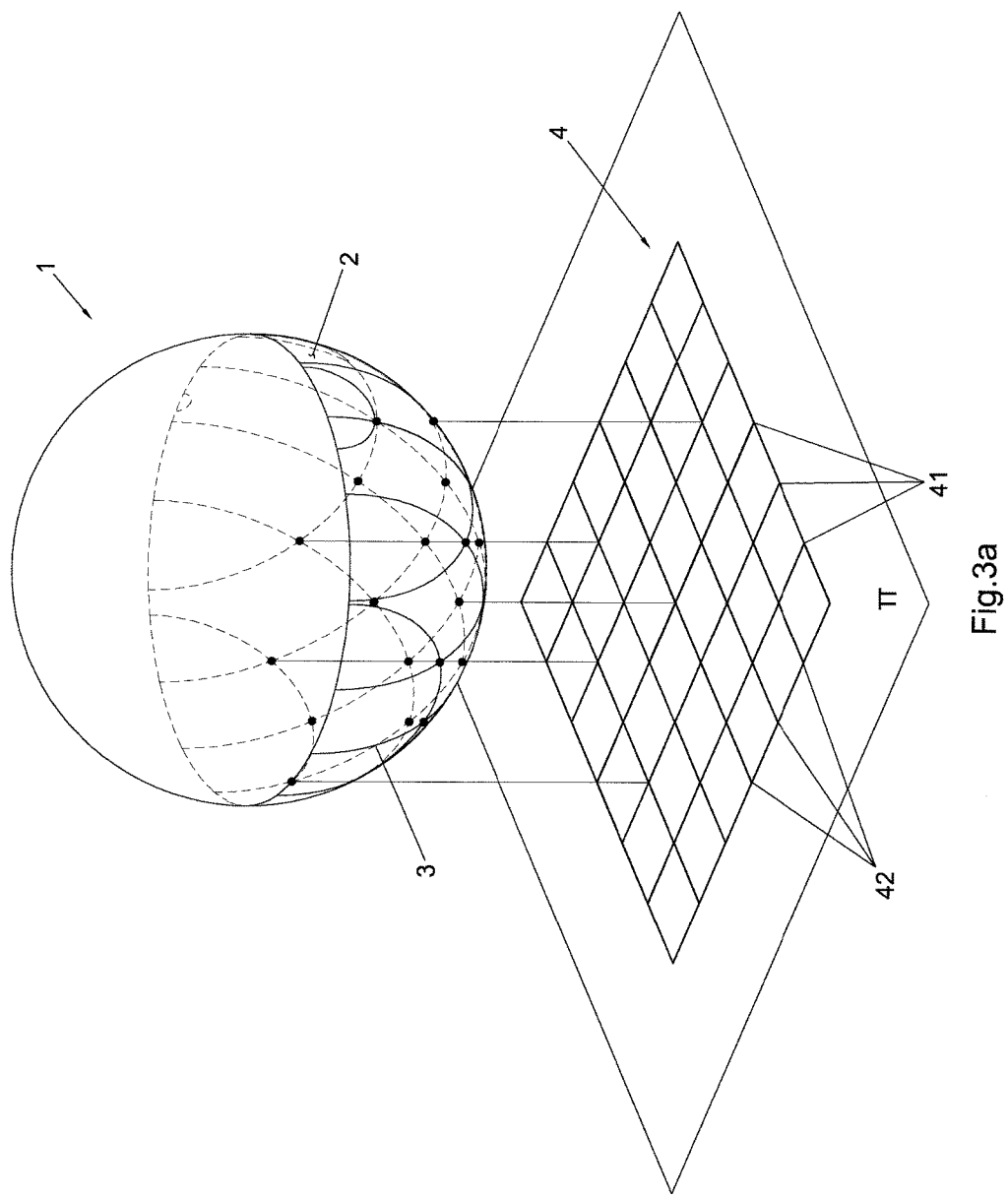

COMPUTER-IMPLEMENTED METHOD FOR DEFINING THE POINTS OF DEVELOPMENT OF SUPPORTING ELEMENTS OF AN OBJECT MADE BY MEANS OF A STEREOLITHOGRAPHY PROCESS

The present invention concerns an improved computer-implemented method for defining, on a three-dimensional model of an object, the points of development of supporting elements of said object during its production by means of a stereolithography process.

The invention concerns also a computer-implemented method for designing a three-dimensional model of an object made by means of a stereolithography process including the execution of the steps of said definition method.

Finally, the invention concerns the computer programs and the electronic processing devices configured to perform the steps of said methods of the invention.

It is known that stereolithography is a technique that makes it possible to obtain three-dimensional objects starting directly from digital data processed by CAD software.

Stereolithography is used mainly in prototyping, as it makes it possible to rapidly obtain three-dimensional objects, even with a complex structure, which can be analyzed and tested before starting mass production.

For this purpose, the stereolithography process is widely used for preparing the three-dimensional models of objects that will be successively produced, for example using the lost-wax casting technique.

The stereolithography process substantially produces three-dimensional objects through the superimposition of a plurality of layers whose thickness is of the order of dozens of micrometers, which are obtained by exposing a liquid resin that can be polymerized in the presence of light to selective light stimulation in the areas corresponding to the volume of the object to be produced.

A plurality of types of stereolithography machines is available on the market, among which, for example, stereolithography machines that substantially comprise a tank suited to contain liquid resin and delimited by a transparent bottom in its lower portion, as well as a modelling head.

The modelling head is positioned above the tank and is provided with a flat surface for supporting the three-dimensional object being formed and with power means that move the flat surface with respect to the bottom of the tank.

At the beginning of the process of production of the object, the flat surface is immersed in the liquid resin until it is positioned at a distance from the bottom corresponding to the thickness of the first layer to be generated.

The resin layer included between the bottom of the tank and the flat surface of the modelling head is selectively exposed to a laser beam originating from a laser emitter arranged under the bottom of the tank and associated with a Cartesian moving unit.

The resin is thus exposed to electromagnetic radiation only in the areas corresponding to the volume of the object to be made and during solidification it adheres to the flat surface of the modelling head.

Once the solidification process has been completed, the head is lifted together with the first generated layer of the object that is adjacent to it in order to allow the level of resin to be restored inside the tank.

Once the resin level has been restored, the head is immersed in the resin again and the operations described above are repeated in order to deposit a second layer that adheres to the first one, and so on until the completion of the object to be produced.

If the object has projecting portions or undercut portions with respect to the base and such portions may collapse or bend, during the process of production of the object special columns, usually called supporting elements, are created for supporting said projecting or undercut portions, wherein said columns constitute an integral part of the object and are removed once the object has been completed.

However, the supporting elements pose the drawback that they require an additional design step, which increases the object's overall production cost and time. This design step usually requires the active intervention of an operator.

The supports pose the further drawback that they cannot be re-used for the production of other objects and therefore are wasted, further increasing the cost of the object.

Furthermore, in the case of some particularly complex objects the supporting elements cannot be produced and this actually limits the possible applications of the stereolithography method.

Clearly, in addition to the drawbacks previously described, the above mentioned technique poses the further drawback that it requires the mechanical removal of the supports, which further increases the cost of the object.

Furthermore, the removal of the supports involves as a further drawback the risk of breakage of the object.

In addition to the above, a further drawback lies in that the production of the object is slowed down, as the stimulation of the base material must be carried out even in the areas corresponding to the supports.

To sum up, the higher the number of supporting elements to be produced, the more complex, slow and expensive the design and production processes.

As regards, in particular, the step of design of said supporting elements, according to the known technique it includes the operation of defining, on the outer surface of the three-dimensional object, the points of development at the level of which said supporting elements have to be made. In greater detail, according to the known art the points of development are defined once the three-dimensional model of the object has been subdivided into the various layers described above. In practice, said design step consists of the operation of identifying the projecting or undercut portions of each layer with respect to the immediately adjacent layers and the step of identifying one or more points of development of said supporting elements on each one of said portions.

To disadvantage, however, the technique just described above poses some important drawbacks.

The first drawback lies in that the definition of the points of development, carried out in this way, depends directly on the determination of the layers into which the three-dimensional model of the object to be made is subdivided. Therefore, in the case where it should be necessary to modify the thickness of each layer and, consequently, to modify the subdivision of the same object into layers, it would be necessary once again to identify said projecting or undercut portions with respect to the immediately adjacent layers, on which the points of development would successively be defined.

Furthermore, to disadvantage, the definition technique of the known art, as already explained, involves the need to define a considerably high number of points of development of said supporting elements, very often even overestimated, with the negative consequences mentioned above, in particular with an extension of the time required for the calculations. Furthermore, as the mutual arrangement of said supporting elements occurs almost randomly, it is uncomfortable to perform the successive cleaning of the object using compressed air or water, due to the fact that said arrangement makes it difficult for said fluids to penetrate among said supports.

Furthermore, also the operation of removal of the same supporting elements arranged randomly is uncomfortable to carry out.

The present invention intends to overcome all the drawbacks mentioned above.

In particular, it is one of the objects of the invention to propose and implement a method for defining the points of development of the supporting elements on the three-dimensional model of the object that makes it possible to define a reduced number of points of development and at the same time makes it possible to obtain suitable support for the entire object being formed.

It is another object of the invention to propose and implement a definition method that makes it possible to define said points of development just once for each object, with no need to repeat this operation if it is necessary to modify the thickness of the layers into which the three-dimensional model of the object is subdivided.

The objects mentioned above are achieved through the computer-implemented method that is the subject of the invention, according to the main claim.

Further characteristics of the method of the invention for defining the points of development are described in the dependent claims.

The invention also includes the computer-implemented method for designing a three-dimensional model of an object to be produced by means of a stereolithography process, according to claim 10.

Furthermore, the invention also includes the computer programs and the electronic processing devices configured to execute the steps of both of said methods, respectively according to claims 11, 12, 13 and 14.

Advantageously, the production of a three-dimensional object designed according to the method of the invention makes it possible to facilitate its cleaning and the removal of the supporting elements from the same object.

Said objects, together with the advantages that are illustrated here below, will be highlighted in the description of a preferred embodiment of the invention that is provided by way of non-limiting example with reference to the attached drawings, wherein:

FIG. 1 shows an axonometric view of a solid sphere;

FIGS. 2a and 2b respectively show the axonometric view and a side view of the solid sphere of FIG. 1 highlighting the surface whose points are oriented towards the reference plane π;

FIGS. 3a and 3b respectively show the axonometric view and the side view of the solid sphere of FIG. 1 in which a grid of points has been traced on the surface highlighted in FIGS. 2a and 2b;

The steps of the computer-implemented method of the invention for defining, on a three-dimensional model of an object, the points of development of supporting elements of the same object during its production by means of a stereolithography process are described here below with reference to the solid sphere 1 shown in FIG. 1.

It is important to specify that the three-dimensional object illustrated is proposed only as an indicative example of any three-dimensional object obtainable through the stereolithography process.

The choice to make reference to the solid sphere 1 is therefore due only to the desire to simplify both the description and the drawings.

It should also be noted that, according to the preferred embodiment of the invention, as already mentioned, the steps of the method are executed by means of a special computer program, of the type known as CAD software in technical jargon, configured to process the digital data related to the three-dimensional model of the object to be made. In particular, said computer program is configured to execute the steps of the method of the invention automatically, that is, without the active intervention of an operator.

Finally, it should be pointed out that from the computational point of view the definition of said points of development includes the determination of the space coordinates x, y and z on the surface of the object to be made, at the level of which the supporting elements are to be generated.

Figure 2A:
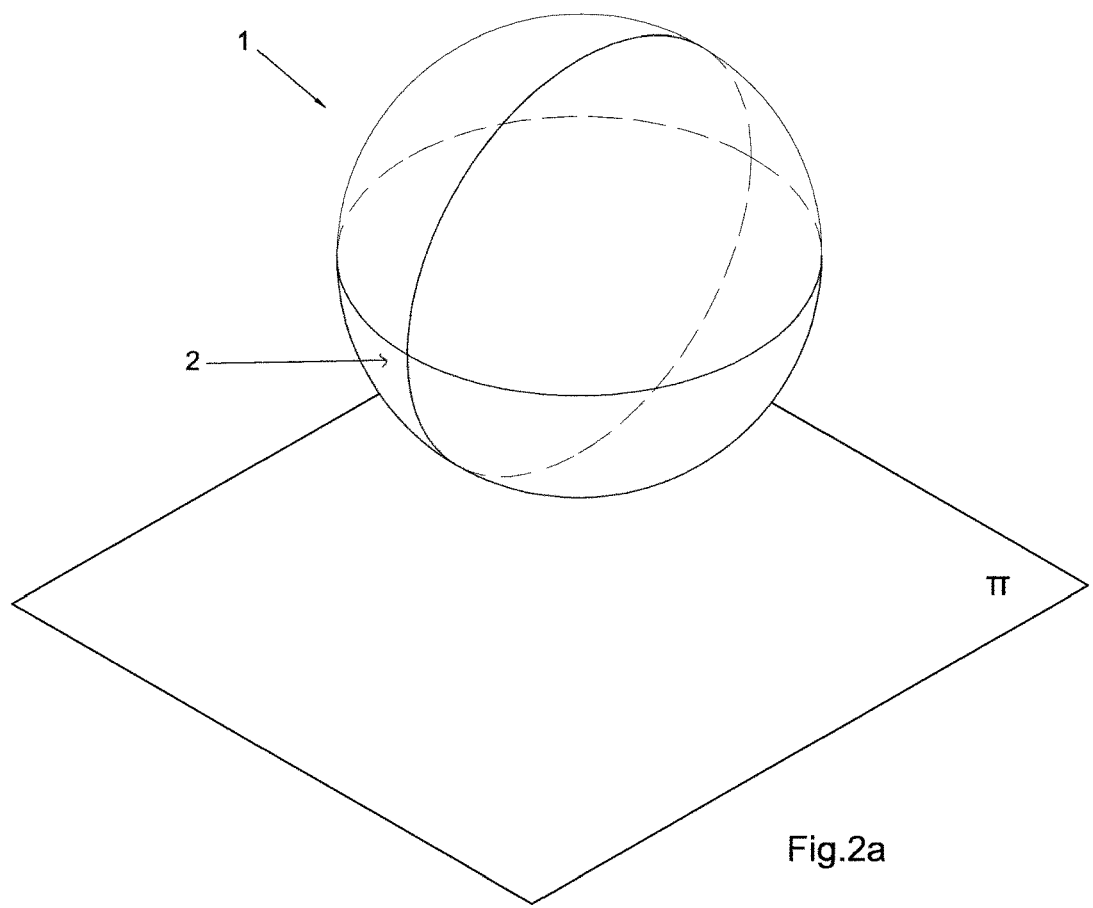
Figure 2B:
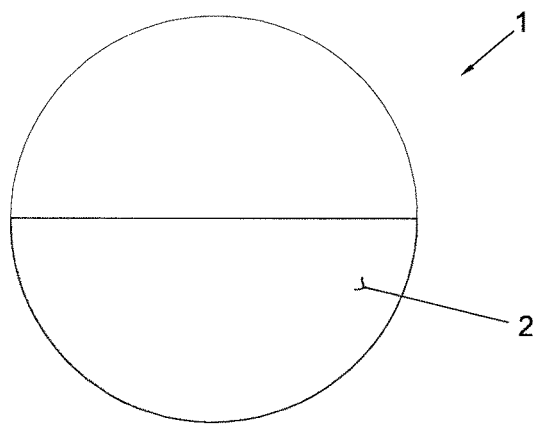

The first step of the method of the invention, as shown in the example of FIGS. 2a and 2b, is the definition of the portion of the surface 2 of the sphere 1 whose points are oriented towards a reference plane π.

Obviously, three-dimensional objects that are more complex than the sphere 1 may comprise more than one surface completely or partially oriented towards said reference plane π. Therefore, in the latter, more complex cases, the method of the invention includes the definition of all the surfaces or portions of the same surfaces whose points are oriented towards a reference plane π.

Furthermore, it should be pointed out that, according to the method of the invention, the surfaces or portions of the latter to be considered comprise the surfaces of the object whose points directly and indirectly face the reference plane π.

According to the method of the invention, after said first step a predefined grid of points 3 is traced on the portion of surface 2 of the sphere 1.

Figure 3B:
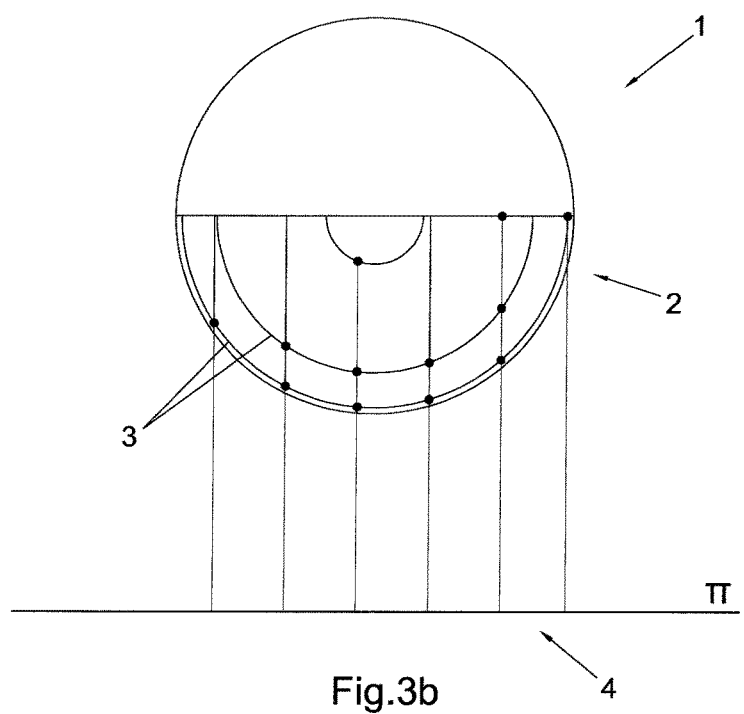

According to the preferred embodiment of the invention, said operation of tracing the grid of points 3 includes first the operation of defining a grid of reference points 4 on said reference plane π and then the operation of projecting the lines and the points of the reference grid 4 on said surface 2 of the sphere 1, as schematically shown in FIGS. 3a and 3b.

It cannot be excluded, however, that in different embodiments of the method of the invention said tracing step consists in the operation of directly defining the grid of points on said surface 2, avoiding the creation of the grid of reference points 4 on the reference plane π, and successively the operation of projecting its lines and points on the sphere 1.

As regards the preferred embodiment of the method of the invention as described and represented herein, the grid of reference points 4, used to determine said points of development, is a grid with rectangular meshes defined by a first plurality of parallel lines 41 and by a second plurality of parallel lines 42, the two pluralities being arranged at right angles with respect to each other. In this case, said points of the reference grid 4 correspond to the points of intersection of the two pluralities of lines 41 and 42 arranged at right angles with respect to each other.

In particular, preferably but not necessarily, the points of the grid are defined in such a way that they are equidistant from one another.

The distance between each one of said points can be defined automatically based on a scale factor that takes in consideration the extension of the specific surface on which the grid must be traced, or it can be parameterized in advance by an operator.

According to a variant embodiment of the method of the invention, this may include the definition of both the grid of reference points 4 and the grid of points 3 on the surface 2, as a grid with triangular meshes, according to which the points of the grid correspond to the vertices of the triangles defined by the same.

Furthermore, according to other embodiments of the invention, both the grid of reference points 4 and the grid of points 3 on the surface 2 may have any distribution of points.

After said definition of the grid of points 3 on the surface 2 of the sphere 1, preferably but not necessarily the method of the invention requires that the position of the grid of points 3 be adapted in such a way that one of its lines of points is superimposed to each one of the edges of said surface 2.

Furthermore, preferably, according to the method of the invention said grid of points 3 is adapted in such a way that one of its lines of points is superimposed to each axis of symmetry of the surface 2, the latter being defined parallel to the same lines of points of the grid 3.

It cannot be excluded, however, that in alternative embodiments of the method of the invention said adaptation operations are not performed.

Going back to the method of the invention, a further step of the same consists in defining, on said surface 2, the local minimum points 5 with respect to the underlying reference plane $\pi$.

Figure 4:
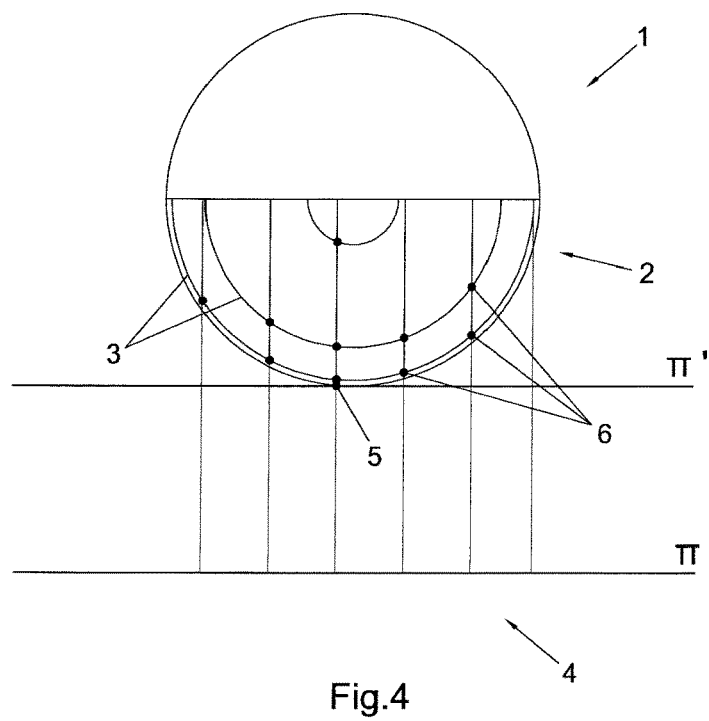
FIG. 4 shows the side view of the solid sphere of FIG. 1 on which the minimum point with respect to the reference plane π is defined.

In this specific case, as shown in FIG. 4, a single local minimum point 5, hereinafter more simply referred to as minimum point 5, is identified.

Clearly, in the case where the object to be produced has a configuration that is geometrically more complex than that of said sphere 1, each surface taken in consideration may have several local minimum points with respect to the reference plane $\pi$. It should be underlined that, in the present description, the term local minimum point is to be understood as including also the vertex of a cusp facing towards said reference plane $\pi$.

In general, said operation of defining the possible one or more local minimum points corresponds to the identification of those points of the surface that pose more structural difficulties during the making of the object through the stereolithography process. Therefore, it is necessary to generate a supporting element at the level of said local minimum points.

For this purpose, returning to the example of sphere 1 of FIG. 4, according to the method of the invention, once said minimum point 5 has been identified, the grid of points 3 defined on the surface 2 is adapted in such a way that one of its points substantially coincides with said minimum point 5.

Obviously, in the case where several local minimum points have been identified in a more complex surface with respect to the surface 2, said step consists in adapting the grid so that, for each one of said local minimum points, the position of one of the points of the grid 3 is changed in order to make them coincide with each other.

Figure 5A:
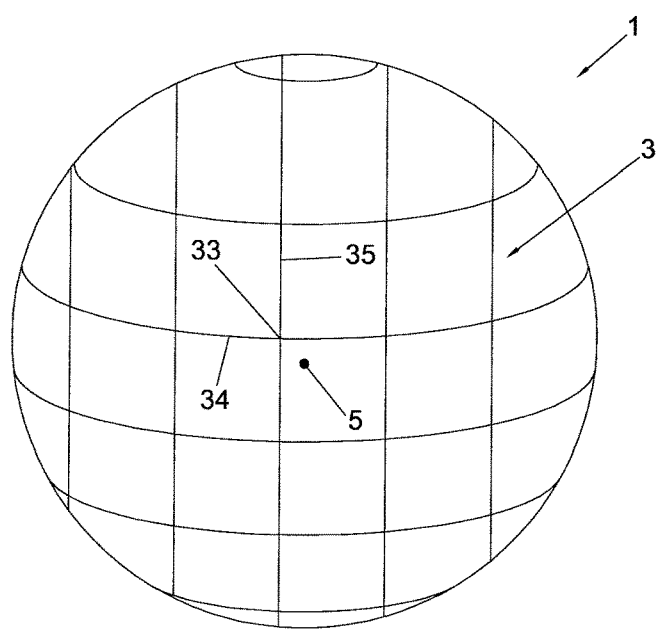
FIG. 5a shows the bottom view of the solid sphere of FIG. 1 on which the minimum point and the grid of points are highlighted.
Figure 5B:
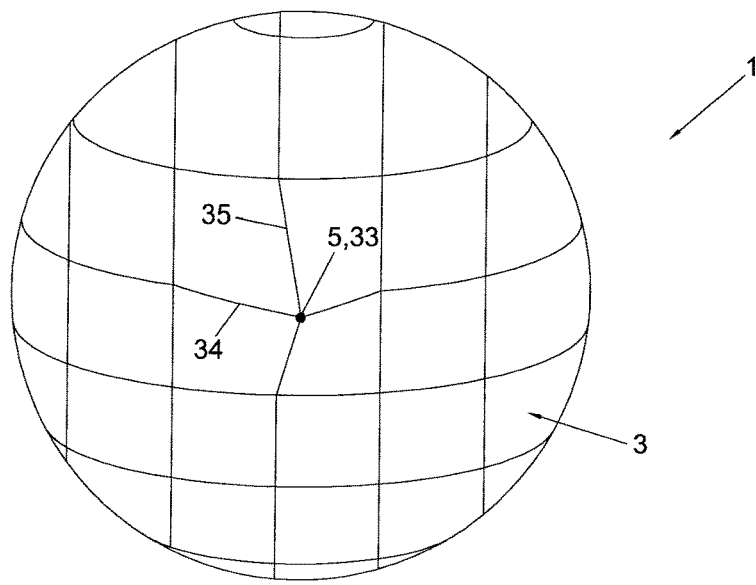
FIG. 5b shows the bottom view of the solid sphere of FIG. 1 on which the shift of a point belonging to the grid of points at the level of the minimum point is highlighted.

According to the preferred embodiment of the invention, this adaptation step consists in modifying the position of the point 33 of the grid 3 that is geometrically nearest to said minimum point 5, both represented in FIG. 5a. This change of position allows the same nearest point 33 to substantially coincide with the minimum point 5, thus leaving the position of the remaining points of the grid 3 unchanged, as schematically shown in FIG. 5b.

Figure 6:
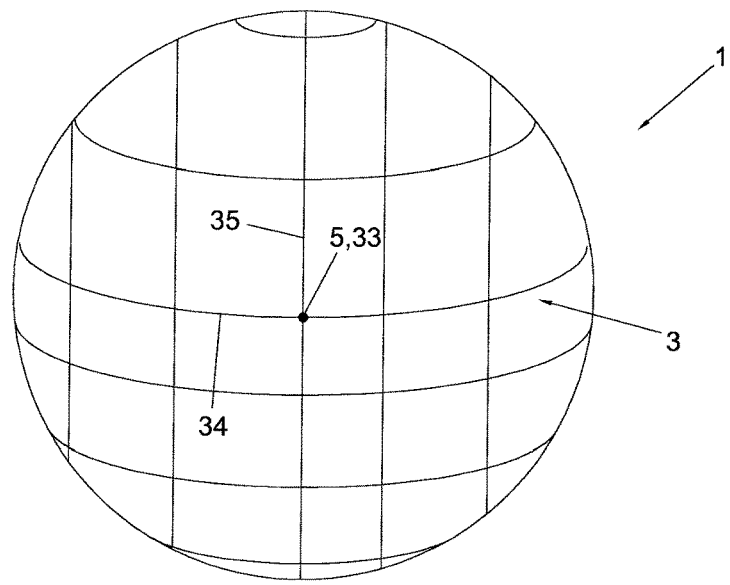
FIG. 6 shows the bottom view of the solid sphere of FIG. 1 on which the shift of two lines of the grid of points is highlighted, which is intended to make a point of said grid coincide with said minimum point.

Alternatively, as schematically shown in FIG. 6, the method of the invention may include, as adaptation step, the step of modifying the position of the two lines of points 34 and 35 comprising said nearest point 33, so that the latter substantially coincides with the minimum point 5, maintaining the position of the remaining lines of points of the grid 3 defined on the surface 2 unchanged.

Furthermore, according to a different embodiment of the method of the invention, said step of adaptation of the grid of points 3 may consist in completely modifying the position of the same grid of points 3, always with the aim to make said nearest point 33 coincide with the minimum point 5 identified. Finally, according to the method of the invention, the points belonging to said adapted grid 3 are identified as the points of development 6 of the supporting elements of said surface 2.

Preferably, according to the preferred embodiment of the method of the invention, further points of development 6 of said supporting elements are added at the level of the edges of the surface 2, in the case where said points 6 have not already been identified on said edges.

However, it cannot be excluded that in alternative embodiments of the method of the invention said last step is not performed.

As already mentioned, the invention includes also the computer-implemented method for designing the three-dimensional model of an object 1 suited to be produced through a stereolithography process. Also in this case, preferably, the design method is implemented through special CAD software in such a way as to modify the characteristics of the three-dimensional model of the object through the manipulation of the corresponding digital data.

Figure 7:
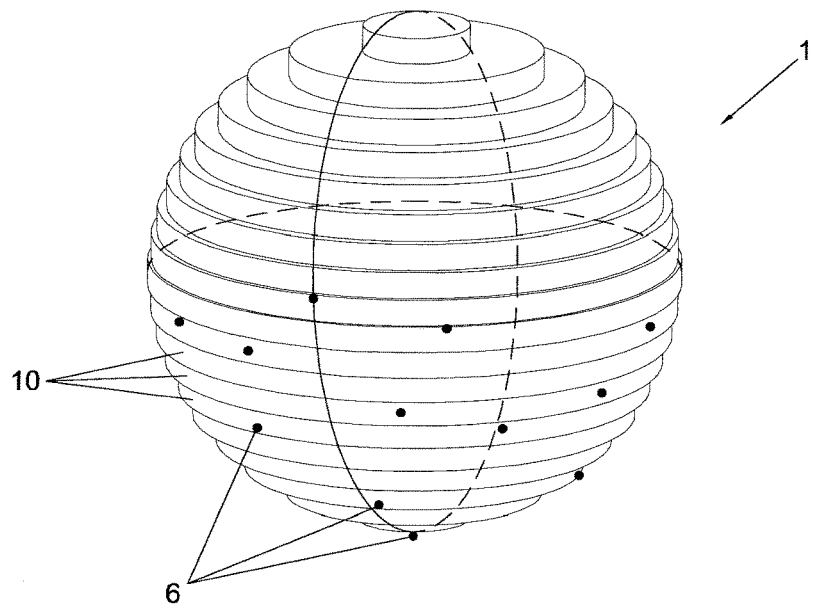
FIG. 7 shows the axonometric view of the solid sphere of FIG. 1 subdivided into layers.

According to the invention, said design method requires first of all that the three-dimensional model of an object 1 be drawn. Successively, said design method consists in the execution of the steps of the method for defining the points of development of the supporting elements as described above. According to the design method, only at the end of said operation of defining the points of development the three-dimensional model of the object 1 is subdivided into a plurality of layers 10 with predefined thickness, manipulating the related digital data, as shown in FIG. 7 with reference to the sphere 1. In this figure, the thickness of each layer 10 has been oversized exclusively in order to offer a clearer representation of the same.

Clearly, the layers 10 are defined in such a way that they are parallel to the reference plane $\pi$.

Finally, according to the preferred embodiment of the design method of the invention, said supporting elements 7 are generated at the level of said points of development 6.

It cannot be excluded, however, that in different embodiments of the design method of the invention said step of generating the supporting elements 7 is performed before the step of subdividing the three-dimensional model of the object 1 into layers.

Figure 1:
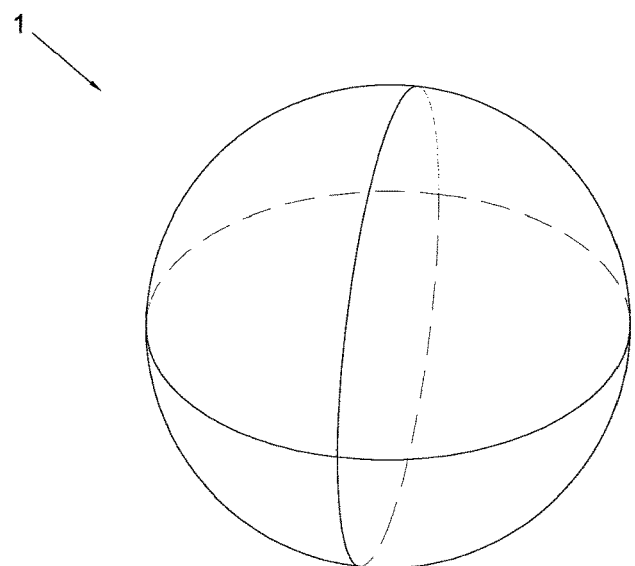
Figure 8:
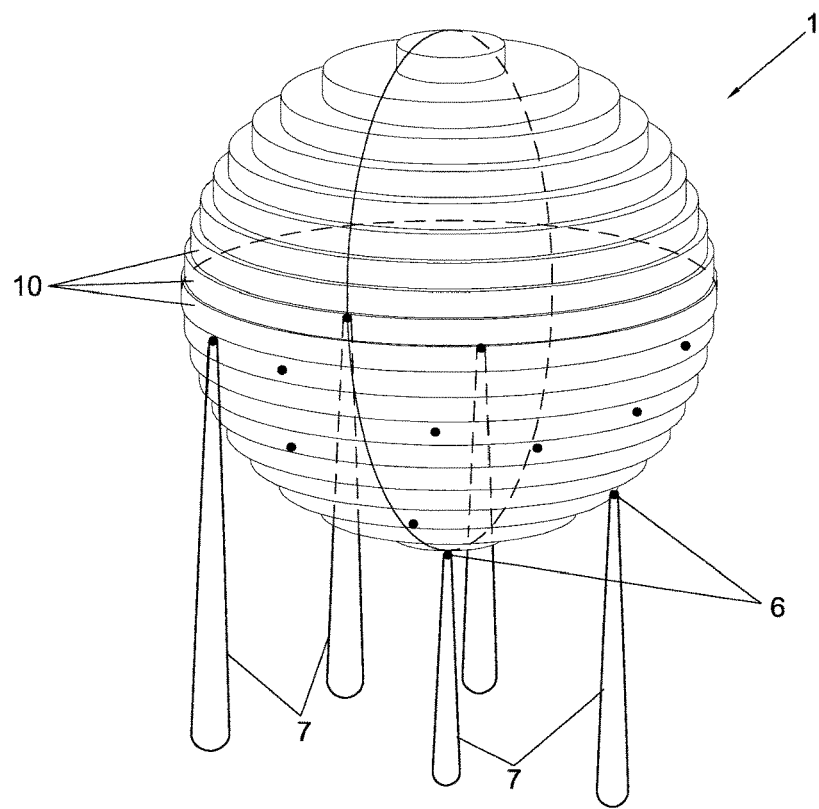
FIG. 8 shows the three-dimensional model of the sphere of FIG. 1 at the end of implementation of the design method that is the subject of the invention.

The final result of the implementation of said design method on the solid sphere 1 of FIG. 1 is shown in FIG. 8.

As already explained, defining the coordinates x, y and z of the points of development of the supporting elements before subdividing the object into layers advantageously avoids the need to repeat said operation of definition whenever it is necessary to modify the thickness of the layers and therefore the subdivision of the object itself.

At the end of the execution of the design method of the invention, the digital data related to the three-dimensional model of the defined object are transferred to a stereolithography machine for production. The data are processed by the stereolithography machine in such a way as to orient said reference plane π so that it is parallel to the flat surface of the same stereolithography machine.

As already explained, the invention includes also the computer program comprising a portion of programming code for the execution of the steps of said definition method of the invention when the computer program is run on an electronic processing device.

Furthermore, the invention includes also the computer program comprising a portion of programming code for the execution of the steps of the design method of the invention when said computer program is run on an electronic processing device.

In particular, both of said computer programs are constituted by apposite CAD software configured for the execution of the steps of said methods.

Furthermore, the invention includes also the electronic processing device comprising storage means in which the programming code portion of the computer program for the execution of the definition method of the invention is stored, as well as processing means, for example a microprocessor, configured to execute the steps of said method.

Finally, the invention includes also the electronic processing device comprising storage means in which the programming code portion of the computer program for the execution of the design method of the invention is stored, as well as processing means, for example a microprocessor, configured to execute the steps of said design method.

According to the above, therefore, the methods of the invention, the related computer programs and said electronic processing devices achieve all the set objects.

In particular, the invention achieves the object to propose a method for defining the points of development of the supporting elements on the three-dimensional model of the object that makes it possible to define a reduced number of points of development and at the same time allows suitable support to be obtained for the various layers that make up the object being formed.

The invention also achieves the object to propose a definition method that makes it possible to define said points of development just once for each object, with no need to repeat said operation when varying the thickness of the layers into which the three-dimensional model of the object must be subdivided.

The invention claimed is:

1. A method for producing a three-dimensional object, including supporting elements of said object in a stereolithography machine controlled by a computer, the method comprising the following steps:
storing in a memory of the computer a program of instructions;
executing the program of instructions to perform the functions of:
defining surfaces of said object whose points are at least partially oriented towards a reference plane;
tracing a grid of points on each one of said surfaces;
defining, for each one of said surfaces, local minima points with respect to said reference plane;
for each one of said surfaces, adapting said grid of points so that one of said points of said grid coincides with each one of said local minima points;
identifying the points of said adapted grid as points of development of said supporting elements for each one of said surfaces; and
driving the stereolithography machine using the points of development to produce the three-dimensional object and the supporting elements through formation of sequential superimposition of solidified layers.

2. The method according to claim 1, wherein further points of development are added at a level of edges of each one of said surfaces.

3. The method according to claim 1, wherein said grid of points is formed by a grid with rectangular meshes defined by a first plurality of parallel lines and by a second plurality of parallel lines, said two pluralities of lines being arranged at right angles with respect to each other, wherein said points of said grid correspond to points of intersection of said two pluralities of lines arranged at right angles with respect to each other.

4. The method according to claim 1, wherein said grid of points is formed by a grid with triangular meshes, wherein said points of said grid correspond to vertices of triangles defined by said grid with triangular meshes.

5. The method according to claim 1, wherein said step of tracing said grid of points on each one of said surfaces includes the definition of a grid of reference points on said reference plane and a projection of lines and points of said reference grid on each one of said surfaces of said object.

6. The method according to claim 1, wherein said step of adaptation of said grid of points includes modification of the position of the point of said grid that is geometrically nearest to a local minimum point, in such a way that said nearest point coincides with said local minimum point.

7. The method according to claim 6, wherein said step of adaptation of said grid of points includes modification of the position of at least one of the lines of points comprising said point that is nearest to said local minimum point, in such a way that said nearest point coincides with said local minimum point.

8. The method according to claim 7, wherein said step of adaptation of said grid of points includes modification of the position of said grid of points in such a way that said nearest point coincides with said local minimum point.

9. The method according to claim 7, wherein the points of said grid are equidistant from one another.

10. The method of claim 1 further comprising the following steps:
drawing said three-dimensional model of said object;
after identifying the points of development of said supporting elements, subdividing said three-dimensional model of said object into a plurality of parallel layers having a predefined thickness.

11. An electronic processing device for defining points of development of supporting elements on three dimensional model of an object and for driving a stereolithography machine during production of the object, processing device comprising:

storage means storing a program of executable instructions;

a processor configured to execute said executable instructions to:
- define surfaces of said object whose points are at least partially oriented towards a reference plane;
- trace a grid of points on each one of said surfaces;
- define, for each one of said surfaces, local minima points with respect to said reference plane;
- for each one of said surfaces, adapt said grid of points so that one of said points of said grid coincides with each one of said local minima points for each one of said surfaces;
- identify the points of said adapted grid as points of development of said supporting elements for each one of said surfaces; and
- drive the stereolithography machine using the points of development to produce the three-dimensional object and the supporting elements through formation of sequential superimposition of solidified layers.

12. The electronic processing device of claim 11, wherein the processor is further configured to execute said executable instructions to:
- subdivide the three-dimensional model of said object into a plurality of parallel layers having predefined thickness.

13. The electronic processing device of claim 11, wherein said grid of points is formed by a grid with triangular meshes, wherein said points of said grid correspond to vertices of triangles defined by said grid with triangular meshes.

14. The electronic processing device of claim 11, wherein said grid of points is formed by a grid with rectangular meshes defined by a first plurality of parallel lines and by a second plurality of parallel lines, said two pluralities of lines being arranged at right angles with respect to each other, wherein said points of said grid correspond to points of intersection of said two pluralities of lines arranged at right angles with respect to each other.

15. A non-transitory computer readable medium storing computer executable instructions which when executed on a computer controlling a stereolithography machine, perform a process, said stereolithography machine producing a three-dimensional object and support elements, the executable instructions comprising instructions to perform the functions of:
- defining surfaces of said object whose points are at least partially oriented towards a reference plane;
- tracing a grid of points on each one of said surfaces;
- defining, for each one of said surfaces, local minima points with respect to said reference plane;
- for each one of said surfaces, adapting said grid of points so that one of said points of said grid coincides with each one of said local minima points;
- identifying the points of said adapted grid as points of development of said supporting elements for each one of said surfaces; and
- driving the stereolithography machine using the points of development to produce the three-dimensional object and the supporting elements through formation of sequential superimposition of solidified layers.

16. The computer readable medium according to claim 15, wherein said grid of points is a grid with rectangular meshes defined by a first plurality of parallel lines and by a second plurality of parallel lines, said two pluralities of lines being arranged at right angles with respect to each other, wherein said points of said grid correspond to points of intersection of said two pluralities of lines arranged at right angles with respect to each other.

17. The computer readable medium according to claim 15, wherein said grid of points is a grid with triangular meshes, wherein said points of said grid correspond to vertices of triangles defined by said grid with triangular meshes.

18. The computer readable medium according to claim 15, wherein said step of tracing said grid of points on each one of said surfaces includes the definition of a grid of reference points on said reference plane and a projection of lines and points of said reference grid on each one of said surfaces of said object.

19. The computer readable medium according to claim 15, wherein said step of adaptation of said grid of points includes modification of the position of the point of said grid that is geometrically nearest to said local minimum point, in such a way that said nearest point coincides with said local minimum point.

\* \* \* \* \*